United States Patent
Olwal et al.

(10) Patent No.: US 12,307,012 B2
(45) Date of Patent: May 20, 2025

(54) RESPONSE TO SOUNDS IN AN ENVIRONMENT BASED ON CORRELATED AUDIO AND USER EVENTS

(71) Applicant: GOOGLE LLC, Mountain View, CA (US)

(72) Inventors: Alex Olwal, Santa Cruz, CA (US); Ruofei Du, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 99 days.

(21) Appl. No.: 18/047,494

(22) Filed: Oct. 18, 2022

(65) Prior Publication Data
US 2023/0132041 A1 Apr. 27, 2023

Related U.S. Application Data

(60) Provisional application No. 63/263,104, filed on Oct. 27, 2021.

(51) Int. Cl.
*G06F 3/01* (2006.01)
*G02B 27/01* (2006.01)
*G06F 3/16* (2006.01)

(52) U.S. Cl.
CPC ........... *G06F 3/015* (2013.01); *G02B 27/017* (2013.01); *G06F 3/012* (2013.01); *G06F 3/013* (2013.01); *G06F 3/165* (2013.01); *G02B 2027/0178* (2013.01)

(58) Field of Classification Search
CPC ......... G06F 3/015; G06F 3/012; G06F 3/013; G06F 3/165; G02B 27/017; G02B 2027/0178
USPC ................................................. 340/573.1
See application file for complete search history.

(56) References Cited

U.S. PATENT DOCUMENTS

| | | | | |
|---|---|---|---|---|
| 10,685,488 | B1* | 6/2020 | Kumar | A61H 23/04 |
| 10,841,724 | B1* | 11/2020 | Tran | G06F 3/013 |
| 11,405,584 | B1* | 8/2022 | Grover | H04N 7/147 |
| 2010/0138222 | A1* | 6/2010 | Herbig | G10L 15/065 |
| | | | | 704/243 |
| 2017/0351485 | A1 | 12/2017 | Kohler et al. | |
| 2018/0020298 | A1* | 1/2018 | Courtois | H04R 25/552 |
| 2018/0302738 | A1 | 10/2018 | Di Censo et al. | |
| 2020/0249752 | A1* | 8/2020 | Parshionikar | G06F 3/016 |
| 2021/0235203 | A1* | 7/2021 | Lunner | H04R 25/609 |

(Continued)

OTHER PUBLICATIONS

International Search Report and Written Opinion for PCT Application No. PCT/US2022/078334, mailed on Jan. 24, 2023, 15 pages.

(Continued)

*Primary Examiner* — Naomi J Small
(74) *Attorney, Agent, or Firm* — Brake Hughes Bellermann LLP

(57) ABSTRACT

The disclosed systems and method correlates user behaviors with audio processing to achieve more accurate conclusions about sounds in a user's environment. These conclusions may, in turn, be used to adjust the way a device, such as AR glasses, operate or respond to the sounds. For example, audio events determined from processing speech can be correlated with behavior events determined by sensing a user to improve a speech-to-text transcript of the speech by separating, or otherwise altering, the text in the transcript by speaker.

23 Claims, 8 Drawing Sheets

(56) References Cited

U.S. PATENT DOCUMENTS

| | | | |
|---|---|---|---|
| 2021/0258703 A1 | 8/2021 | Wexler et al. | |
| 2021/0337307 A1* | 10/2021 | Wexler | G06V 40/161 |
| 2022/0214858 A1* | 7/2022 | Karri | G06F 18/24 |
| 2022/0230079 A1* | 7/2022 | Tekin | G06V 10/82 |
| 2022/0269887 A1* | 8/2022 | Chee | H04S 7/304 |
| 2023/0062598 A1* | 3/2023 | Nathan | H04R 1/08 |
| 2023/0087494 A1* | 3/2023 | Vilsmeier | G06T 7/337 |
| 2023/0125416 A1* | 4/2023 | Rodriguez Bravo | G06T 19/006 345/633 |
| 2024/0195916 A1* | 6/2024 | Schiøler | G06F 3/167 |

OTHER PUBLICATIONS

Hadley, et al., "Speech, Movement, and Gaze Behaviours During Dyadic Conversation in Noise", Scientific Reports, Sci Rep., 2019, 13 pages.

Lopez-Poveda, "Development of Fundamental Aspects of Human Auditory Perception", Development of Auditory and Vestibular Systems, 2014, pp. 287-314.

Vadiraj, et al., "Automatic Identification of Speakers Form Head Gestures in a Narration", IEEE; ICASSP, 2020, pp. 6314-6318.

\* cited by examiner

Before:

Are you sure you want to go there first? It might take a while. I'd actually prefer if we didn't Excuse me, here is your coffee After:

Are you sure you want to go there first? It might take a while.

I'd actually prefer if we didn't.

Excuse me, here is your coffee.

FIG. 5A

Before:

Are you sure you want to go there first? It might take a while. I'd actually prefer if we didn't Excuse me, here is your coffee After:

Are you sure you want to go there first? It might take a while.
I'd actually prefer if we didn't.
Excuse me, here is your coffee.

FIG. 5B

Before:

Are you sure you want to go there first? It might take a while. I'd actually prefer if we didn't Excuse me, here is your coffee After:

P1: Are you sure you want to go there first? It might take a while
P2: I'd actually prefer if we didn't
P3: Excuse me, here is your coffee.

FIG. 5C

Visualization before turning head
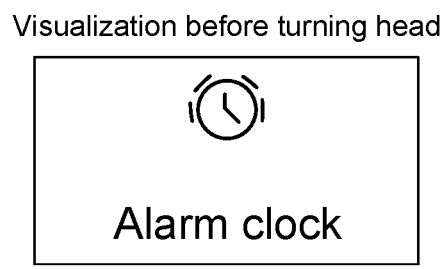
Visualization after turning head and point an arrow to the alarm
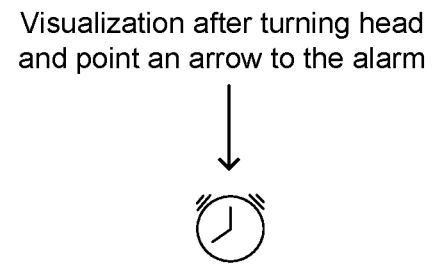
FIG. 6

RESPONSE TO SOUNDS IN AN ENVIRONMENT BASED ON CORRELATED AUDIO AND USER EVENTS

CROSS-REFERENCE TO RELATED APPLICATION

This application claims the benefit of U.S. Provisional Application No. 62/263,104, filed on Oct. 27, 2021, which is hereby incorporated by reference in its entirety.

FIELD OF THE DISCLOSURE

The present disclosure relates to devices having a heads-up display (HUD) and more specifically to smart eyewear configured to display messages corresponding to sounds.

BACKGROUND

Smart eyewear, such as augmented-reality (AR) glasses can be configured to display information in a line-of-sight of a user to help a user understand their environment. For example, speech/sound in the environment may be transformed into visual representations (i.e., captions), which can be especially helpful to deaf and hard-of-hearing users. The displayed captions may not indicate the origins of the transcribed speech/sound, which may create confusion in a multi-speaker or crowded environment. Indicating a source of the speech/sound in the captions requires additional information, but obtaining this additional information using only audio processing may not be reliable in some environments.

SUMMARY

In at least one aspect, the present disclosure generally describes a method. The method includes capturing audio from an environment and analyzing the audio to detect audio events. The method further includes sensing a user to measure features of the user and analyzing the features to detect behavior events. The method further includes correlating a particular audio event with one or more of the behavior events using a machine learning model, and based on the correlation, the method includes increasing a confidence level of the detected audio event.

In a possible implementation the capturing of audio may be performed by one or more microphone(s) in order to enable detecting audio events by analyzing the audio. A detection of a particular audio event may be based on categorizing the captured audio (using categories such as "speaker change" and "speaker location") in order to associate a respective captured audio with an audio event (e.g., speaker change). A confidence level may be assigned to the detection of a particular audio event based on the captured audio.

In a possible implementation, the sensing of a user may be performed by using one or more sensor(s) in order to measure features of the user and to enable detecting behavior events by analyzing the features of the user. More specifically, a detection of a feature may be based on sensor signals representing the feature exceeding at least one given threshold. Detected features may be analyzed in combination (e.g., using a probabilistic classifier) to predict (i.e., detect, classify) a behavior event that is associated with the detected features. The prediction (i.e., detection) may be expressed as a probability that the prediction is correct.

In a possible implementation, the correlating using a machine learning model may include optimizing a system of equations based on training data that includes behavior events commonly occurring with audio events so that the machine learning model can output a correlation to indicate how likely a behavior event is associated with an audio event (and vice versa). Further, the machine learning model can be trained to output a higher correlation when a time difference between a behavior event and the audio event is smaller. For example, a behavior event and an audio event that are trained as likely to occur together and that occur at the same time may have a high correlation.

In a possible implementation, the confidence level assigned to a particular audio event may be increased based on its correlation with at least one behavior event.

In some aspects, the techniques described herein relate to an augmented reality glasses including: a microphone array configured to capture audio from an environment of a user; an inertial measurement unit configured to measure a position of a head of the user; an eye tracker configured to measure a gaze of an eye of the user; a heads-up display configured to display AR information to the user; and a processor configured by software instructions to: analyze the audio to detect audio events; analyze the position of the head of the user and the gaze of the eye of the user to detect a plurality of behavior events; correlate a particular audio event of the audio events with at least one behavior event of the plurality of behavior events using a machine learning model; and increasing a confidence level of the particular audio event based on the correlation.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

FIGS. 5A-5C illustrate example transcripts before and after speaker segmentation according to possible implementations of the present disclosure.

FIG. 6 graphically illustrates a possible user-interface response to an alarm sound having a correlated behavior detected according to a possible implementation of the present disclosure.

DETAILED DESCRIPTION

Figure 1:
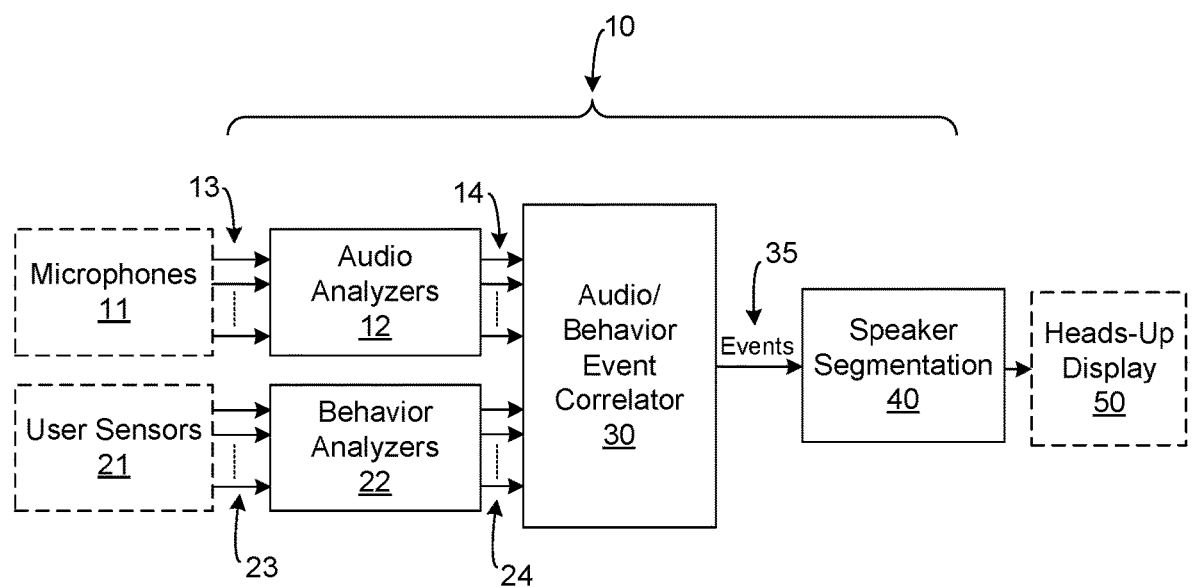
FIG. 1 is a block diagram of a computing pipeline for detecting sound events according to an implementation of the present disclosure.

Smart eyewear can be configured to transcribe (i.e., caption) speech and other sounds as they occur in a user's environment. The resulting transcripts (i.e., captions) can be displayed to help the user understand the speech/sound. For example, a user wearing AR glasses may view a speech-to-text transcript of speech from a conversation in a portion of a heads-up display of the AR glasses as it occurs. Because the transcript is displayed on the heads-up display of the AR glasses, the user can remain more visually engaged with the conversation even as the user refers to the transcript for understanding.

A problem exists when the displayed transcript includes unidentified speech/sound from the environment as they occur (e.g., as a scrolled list). This unidentified sound-source approach can lead to confusion, especially for a deaf or hard-of-hearing user. For example, a user may have difficulty identifying a source of a transcribed sound in a multi-speaker environment (e.g., group meeting, coffee shop, etc.) and/or in a noisy environment (bus, airport, etc.).

To mitigate this problem, the AR glasses may be configured to analyze the audio of the sounds to identify the sound sources. For example, the AR glasses may be configured with multiple microphones configured to operate as a microphone array with a peak sensitivity (i.e., beam) that can be steered (i.e., beamformed). The beam of the microphone array can be steered towards a sound source (e.g., speaker) to increase (e.g., amplify) sounds from the sound source. Further, the beam may help decrease (e.g., attenuate) sounds from other sound sources. For example, a beam having a small beam width (e.g., 5 degrees) can suppress sounds not within the beam width. Adaptive beamforming can help to understand the sound sources so that the speech in the transcript can be separated and identified (i.e., speech/sound segmentation). The adaptive beamforming may be further aided by signal processing to separate sound sources (i.e., sound separation).

Adaptive beamforming and sound separation may be insufficient to reach a conclusion about a sound source with confidence. For example, some environments may be too noisy or too crowded to accurately locate a sound source (i.e., sound localization) using beamforming alone. In another example, speech from two speakers may be too similar to determine when one speaker has stopped speaking and the other has started speaking (i.e., speaker change) using sound separation alone. In these situations, and others, additional information may be needed to help increase (or decrease) a confidence level associated with these determinations.

The disclosed approach can sense one or more features of a user to obtain behavior information about a user, such as a behavior event. The features of the user can be low-level features. Low-level features can be sensor signals measured directly from a sensor related to something the user does (e.g., physical movement) or something the user is/has (e.g., a physical condition). The low-level features can be continuous signals that vary in real time with a user. In one example, low-level features include velocity/acceleration of the user's head. In another example, low-level features include a pupil size/position of the eye(s) of the user. In another example, the low-level features include a skin conductance of the user. In another example, the low-level features include a blood oxygenation of a user.

Low-level features can be used to determine high-level features. For example, a high-level feature can be sensed based on one or more low-level features. Accordingly, high-level features may not represent a sensor signal directly but rather may be an occurrence of a physical movement or physical condition of a user derived from the sensor signal(s). The high-level features may not be continuous signals that vary in real time, but rather, can be events that occur at a particular time and that may remain for a period after the particular time. In other words, a high-level feature may correspond to a state of the user. In one example, high-level features include a head-turn of the user. In another example, high-level features include a change in a gaze of the user. In another example, high-level features include a heart rate of a user.

One or more low-level features and/or one or more high-level features can be analyzed to detect a behavior of a user. A behavior corresponds to a mental condition (e.g., intention, emotion, etc.) of the user and therefore can be expressed as a hypothesis having an associated probability. A behavior event can be a change to the mental condition and can therefore occur at a particular time. When multiple behavior events occur at approximately (e.g., within a few seconds) they may be considered correlated behavior events. In one example, behavior events can include a change in a user's attention. In another example, behavior events can include a change in a user's cognitive load. In another example, behavior events can include a change in a user's emotion (e.g., surprise). Behaviors can be implemented as behavior signals having levels corresponding to a range of probabilities (e.g., 0% to 100%). A behavior event for a behavior signal can be an event signal based on a comparison of the level of a behavior to a threshold.

The behavior events can be correlated with audio events, such as sound localization or speaker change, to improve a confidence in these results. For example, when one or more behavior events occur at a time that is approximately (e.g., within a few seconds) the same time as an audio event, they may be considered correlated. This correlation may increase the confidence (i.e., probability) of a hypothesis of the behavior. This increase can improve the detection of events occurring in speech detected by analyzing audio from an environment of a user. This improvement may help with the generation of transcripts with speaker segmentation and/or may facilitate new applications, such as behavior-adapted sound-notifications.

FIG. 1 is a block diagram of a computing pipeline for detecting sound events according to an implementation of the present disclosure. The computing pipeline 10 includes processes (i.e., software processes) that can be configured to identify events 35 related to speech/sound in the environment. These events 35 may be used for a variety of applications, such as speech/sound separation/identification (i.e., speaker segmentation 40), which can be used to generate segmented transcripts for display on a heads-up display 50 (e.g., of smart glasses).

As shown in FIG. 1, microphones 11 are configured to transform speech/sound (i.e., audio) from an environment into audio channels 13. The audio channels 13 may be streamed into one or more audio analyzers 12 that are configured to detect one or more audio events 14. At the same time (i.e., in parallel), user sensors 21 are configured to transform features from a user into feature channels 23. The feature channels 23 may be streamed into one or more behavior analyzers 22 that are configured to detect one or more behavior events 24. The audio events 14 and the behavior events 24 are streamed into an audio/behavior event correlator 30 that is configured to identify events 35 related to sounds. The identification may include determining a confidence level related to a possible event (i.e., event hypothesis) and concluding that the event has occurred when the confidence level is above a threshold. The correlation of a sound event with one or more behavior events can increase a confidence level for a possible event.

Figure 2:
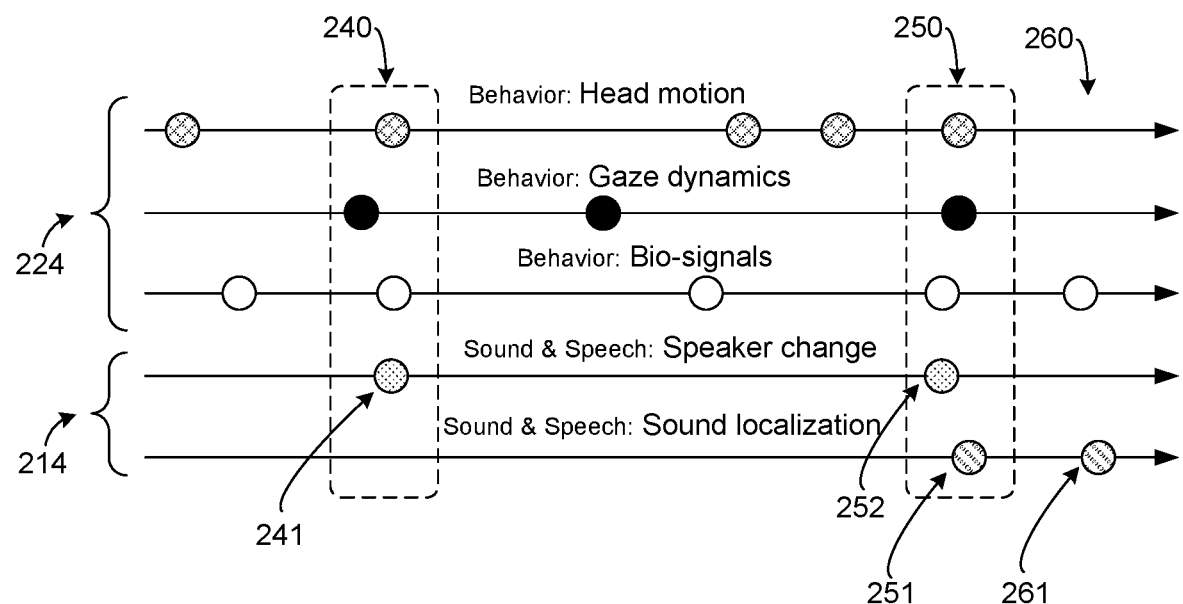
FIG. 2 illustrates streams of possible audio events and possible behavior events that can be correlated to determine an event according to a possible implementation of the present disclosure.

FIG. 2 illustrates streams of audio (i.e., sound and speech) events and behavior events according to a possible implementation of the present disclosure. The streams of behavior events 224 and the streams of audio events 214 are aligned in time. Correlating the events may help to raise a confidence about an audio event.

As shown in FIG. 2, at a first time 240 a speaker-change event 241 is detected. For example, analysis of audio signals may indicate that a new speaker is talking at the first time 240. Additionally, several behavior events are detected and correlated in time with the speaker-change event 241. In particular an event related to a head motion of a user is detected (e.g., a head turn), an event related to gaze dynamics of an eye (or eyes) of a user (e.g., a change in gaze), and an event related to bio-signals (e.g., change in heart rate) are detected with the speaker-change event 241. These correlated events may be used to boost the confidence level of the speaker-change event 241 so that a first event related to speaker change may be concluded at the first time 240.

Also as shown in FIG. 2, at a second time 250 a sound localization event 251 is detected. For example, analysis of audio signals may indicate a change in the location of speech/sound in an environment at the second time 250. This localization event is correlated with a speaker change event 252. This speaker change event 252 has a high confidence level because of the correlated behavior events. Accordingly, the confidence level of the sound localization event may be increased so that a second event related to sound location (and speaker change) may be concluded at the second time 250.

Also as shown in FIG. 2, at a third time 260 a sound localization event 261 is detected. Unlike the previous sound localization event, this sound localization event does not have many supporting events to boost its confidence level. For example, the only supporting event is an event related to bio-signals. Accordingly, no event related to speech/sound is concluded.

Returning to FIG. 1, the audio/behavior event correlator may be realized through one or more machine learning models that are trained (e.g., during a training process) on various behavior events correlated with audio events. Each of the machine learning models may be implemented as a classical machine learning technique (e.g., state vector machine (SVM), random decision forests, etc.) or as a neural network. The choice may be based on processing capabilities, network connectivity, power consumption constraints, and memory size.

In some implementations, the use of the machine learning model may update its capabilities through use. For example, if (i) speaker-change events are detected in audio with a higher confidence and (ii) each of these speaker-change events has a correlated head-movement event, then the system may raise (i.e., boost) the confidence of a speaker-change event detected in audio with a lower confidence if a correlated head-movement is detected.

Figure 3A:
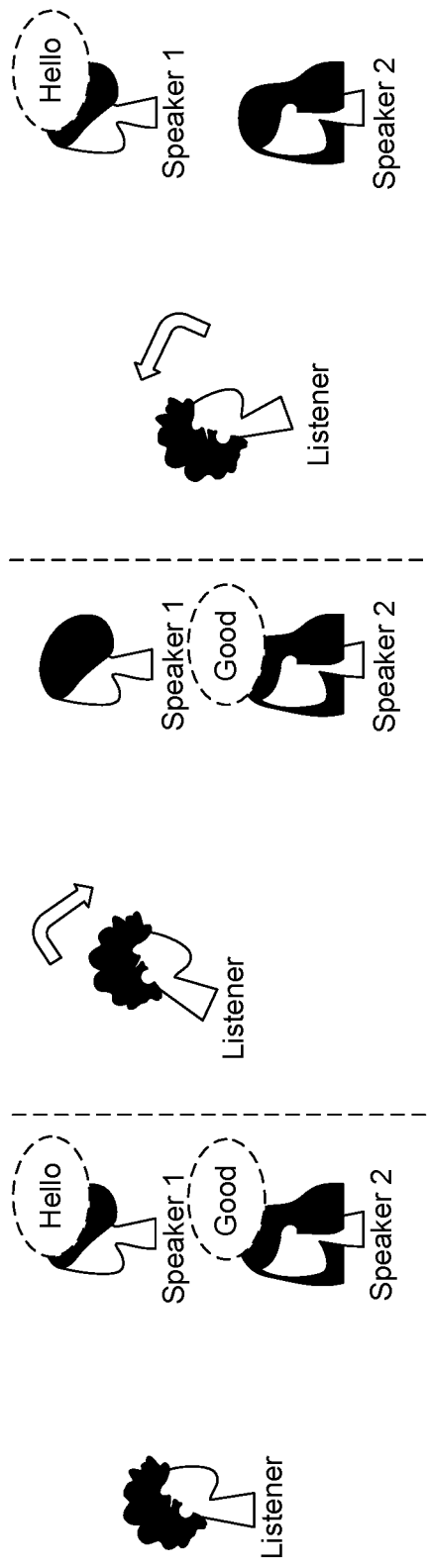
FIG. 3A illustrates a head movement correlated with a speaker change according to a possible implementation of the present disclosure.

The various behavior events may include events related to head motion. People turn their heads towards sound and speech. A motion of a head of a user can be sensed and/or tracked using sensors of varying fidelity to capture relative or absolute motion. Sensors may consist of an inertial measurement unit (IMU) including one or more accelerometers, magnetometers, and gyroscopes that can generate position/orientation information (e.g., 1 to 9 possible features). Tracking a position change or movement of the head may indicate a speaker change. FIG. 3A illustrates a head movement correlated with a speaker change according to a possible implementation of the present disclosure.

The various behavior events may include events related to gaze dynamics of a user. Eye parameters of a user may be detecting/tracking eyes of a user via user-worn eye cameras (e.g., smart glasses) or environment eye cameras (laptop/tablet). Eye parameters may include (but are not limited to) saccades, fixations, pupil size, and/or vergence.

Behaviors may be determined from the eye features. For example, eye movement may be detected/measured based on saccades, attention may be detected/measured based on fixations, cognitive load may be detected/measured based on pupil size, and distance to focused objects may be measured based on the vergence of the user's eyes.

Figure 3B:
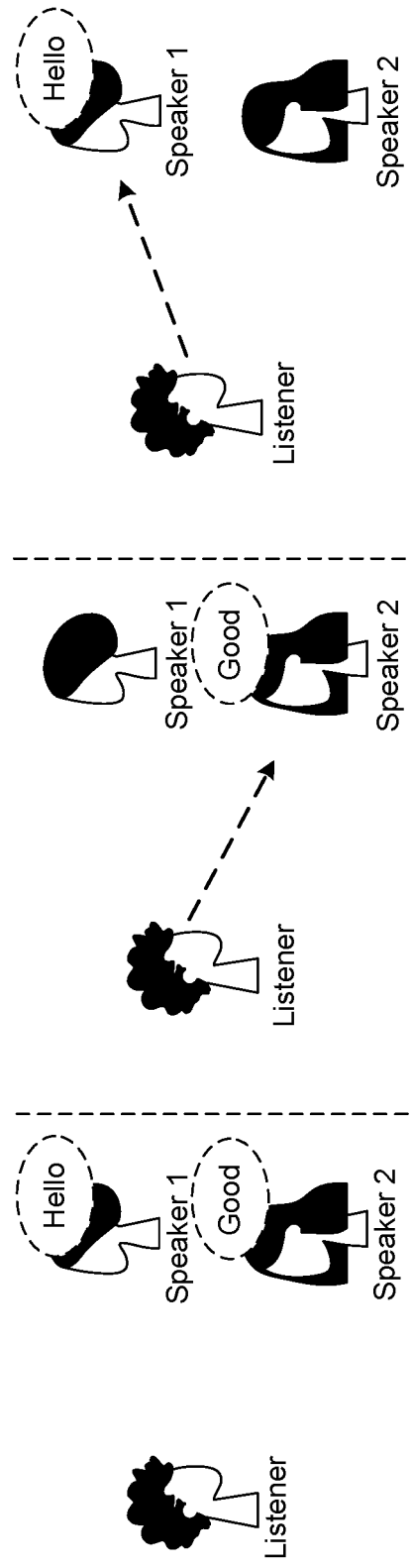
FIG. 3B illustrates a gaze change correlated with a speaker change according to a possible implementation of the present disclosure.

The behaviors may be detected/measured using machine learning models or comparisons (e.g., thresholds, lookup tables, etc.). The choice may be based on available resources (e.g., processor, communication, power, etc.). Tracking a gaze change may indicate a speaker change. FIG. 3B illustrates a gaze change correlated with a speaker change according to a possible implementation of the present disclosure.

The various behavior events may include events related to bio-signals of a user. Health-sensing technology, which could be either user-worn (e.g., wrist worn) or remote (e.g., camera-based) can be leveraged to associate user's reactions to sound and speech. Sensors used for measuring bio-signals (i.e., biosensors) can include (but are not limited to) a galvanic sensor configured to measure a galvanic skin response (GSR) of a user. The biosensors can further include a photoplethysmography (PPG) sensor configured to measure an oxygenation level of blood, a pH of sweat, and/or a heart rate of a user. The biosensors can further include motion sensors to capture movement of the user.

Behaviors may be determined from the signals generated by the biosensors. The signals from the sensor may be used to determine the behaviors. For example, the signals may be applied to machine learning models and/or comparisons (e.g., thresholds, lookup tables, logic etc.) in order to determine behaviors. For example, stress/surprise may be detected/measured based on GSR and/or heart rate. In another example, a motion of the user may indicate a speaker change.

Figure 4:
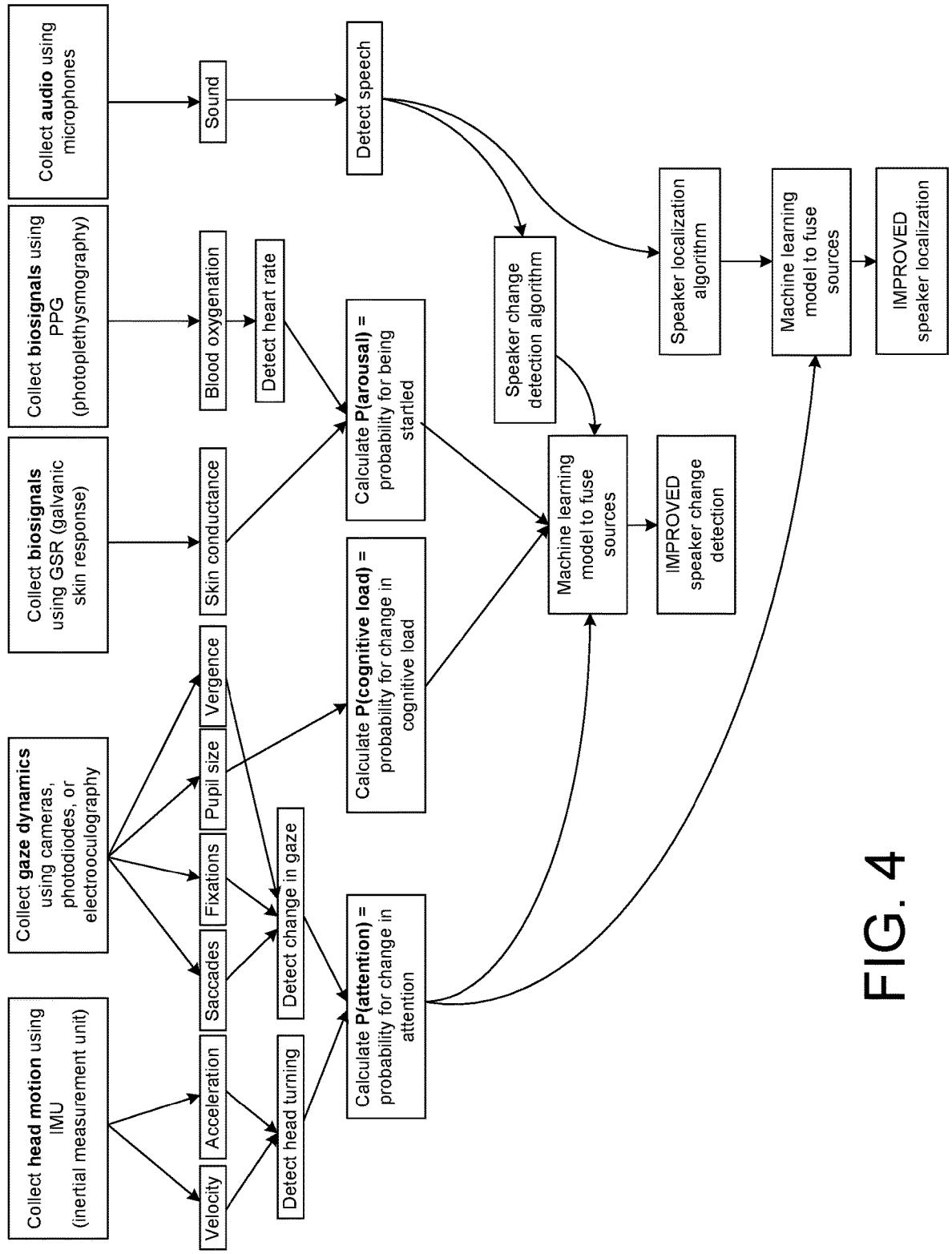
FIG. 4 is a flowchart of processes for correlating audio events and behavior events to improve a function associated with sounds in an environment according to an implementation of the present disclosure.

FIG. 4 is a flowchart of processes for correlating audio events and behavior events to improve a function associated with sounds in an environment according to an implementation of the present disclosure. The processes include collecting (e.g., sensing, measuring) audio data regarding speech/sounds and a user. For example, microphones may be used individually or as an array to collect sounds from an environment. The microphones may be included in a head-worn device (e.g., AR glasses). The sounds may be processed to detect speech. The speech may be processed to detect a speaker change and/or localize a speaker.

The processes further include collecting (e.g., sensing, measuring) data regarding behavior of a user. The collection of this behavior data may require a variety of sensors. Some of the sensors can be included in a head-worn device (e.g., AR glasses) while others can be included in a device worn on the wrist (e.g., health tracker, smart watch) that is in communication with the head-worn device.

The sensors can include an IMU, a GSR sensor, and/or a PPG sensor. The IMU may be used to collect low-level features (e.g., velocity, acceleration) related to a head motion. One or more eye sensors (e.g., cameras, photodiodes, electrooculography sensors) may be used to collect (i.e., measure) low-level features (e.g., saccades, fixations, pupil size vergence) of an eye (or eyes) of a user. A GSR sensor may be used to collect low-level features (e.g., skin conductance) related to the sweat of a user. A PPG sensor may be used to collect low-level features (e.g., blood flow) of a circulatory system of a user.

These low-level features may be combined to determine high-level features. As shown in FIG. 4, a velocity and acceleration of a head motion may be combined to detect a head turning. Further, saccades, fixations, and/or vergence may be combined to detect a change in gaze. Still further, blood oxygenation and/or blood flow may be combined to detect a heart rate.

Behaviors may be estimated based on the low-level features, the high-level features, or some combination of the low-level features and high-level features. Each behavior may be calculated as a probability of the behavior. As shown in FIG. 4, a probability that the user's attention has changed may be based on the detection of a head turn and a change in gaze of the user. A probability that the user's cognitive load has changed may be based on the detection of a pupil size of one eye, or both eyes, of the user. A probability that the user is startled (i.e., surprised, shocked) may be based on the detected skin conductance and heart rate of the user. The estimation of the behaviors may be implemented using machine learning models or signal processing models for each of the behaviors.

The behaviors can be combined with the detection of sound events to improve the detection. As shown in FIG. 4 a machine learning model (i.e., audio/behavior event correlator 30) can be used to fuse the information in order to improve a detection. For example, a change in the user's attention, a change in the user's cognitive load, and/or the user being startled can improve the detection of a speaker change by increasing a confidence that there was a speaker change or was not a speaker change. Likewise, a change in the user's attention (or lack thereof) may be used to improve speaker localization. For example, the added information may help determine if the user location is aligned with the user's attention. If so, a confidence in the speaker localization may be increased, and if not, the confidence in the speaker localization may be decreased. The improvements may further enable a variety of applications.

The disclosed approach may enable a variety of applications. In one possible application, the presentation of transcripts and sound visualization may be augmented or otherwise improved. Smart eyewear (i.e., smart glasses, augmented reality glasses) can be configured to display visual information that indicates the direction of a source of speech/sound (i.e., relative to a direction of the smart glasses).

In another possible application, transcripts displayed on smart eyewear, mobile phone/tablet, or computer can be segmented to indicate speaker. FIGS. 5A-5C illustrate example transcripts before and after speaker segmentation. FIG. 5A illustrates a speaker segmented transcript using line breaks to separate speakers. FIG. 5B illustrates a speaker segmented transcript using colors to separate/indicate speakers; and FIG. 5C illustrates a speaker segmented transcript using indentation and tags to separate/indicate speakers.

In another possible application, behaviors detected after a sound event can be used to generate a response and/or adapt a function in smart eyewear (e.g., AR glasses). In one possible implementation, behavior events correlated with sounds identified as from an alarm may trigger a response in smart eyewear. For example, sounds that require attention (e.g., alarm clock, doorbells, smoke alarms, announcements, etc.) correlated with a user's behavior (e.g., head motion, heart rate) may signal that they have heard the alarm. Accordingly, the smart eyewear may be triggered to respond to the behavior. For example, the smart eyewear may be triggered to cease or decrease a notification about the alarm (e.g., switch from audio to visual alarms, decrease/mute volume of an alarm, etc.). Alternatively, if no head motion alarm confirmation is received, then the smart eyewear may be triggered to increase (i.e., intensify) a notification about the alarm (e.g., increase alerts, generate reminders, store transcriptions, etc.).

FIG. 6 graphically illustrates a possible user-interface response to an alarm sound having a correlated behavior detected according to a possible implementation of the present disclosure. As shown, before a head turn is detected a transcript related to the alarm may be displayed in AR glasses over a user's field of view. After a head turn is detected the display may change to an arrow pointing in a direction of the alarm sound. In a possible use case, when an alarm rings but the user does not turn their head to the alarm, an ambient glow can occupy the screen to urge the user to turn their head to the alarm. When the AR glasses detect that the user is approaching the alarm, arrows may indicate which alarm is ringing.

In another possible application, behavior events related to an interest of a user that are correlated with sounds may trigger a response in smart eyewear (e.g., AR glasses). For example, the precision (e.g., beam width) of beamforming may be adjusted based on an interest of a user. Additionally, or alternatively, noise cancellation algorithms may be adjusted based on interest of a user. In one possible use case, noise cancellation may be switched to audio transparency (i.e., switched OFF) in response to speech if a behavior event indicates that the user is interested in the speech.

In another possible application, behavior events related to sounds may change transcriptions in AR glasses. For example, with a user's permission, AR glasses may be configured to record a user's behavior events. The record of behavior events can be played back as a diary. In one possible use case, a user practicing a presentation may record the behaviors during the presentation (e.g., head motion, heart rate, etc.) with a speech-to-text transcription of the presentation for later playback to help identify errors and improve their presentation skills.

Figure 7:
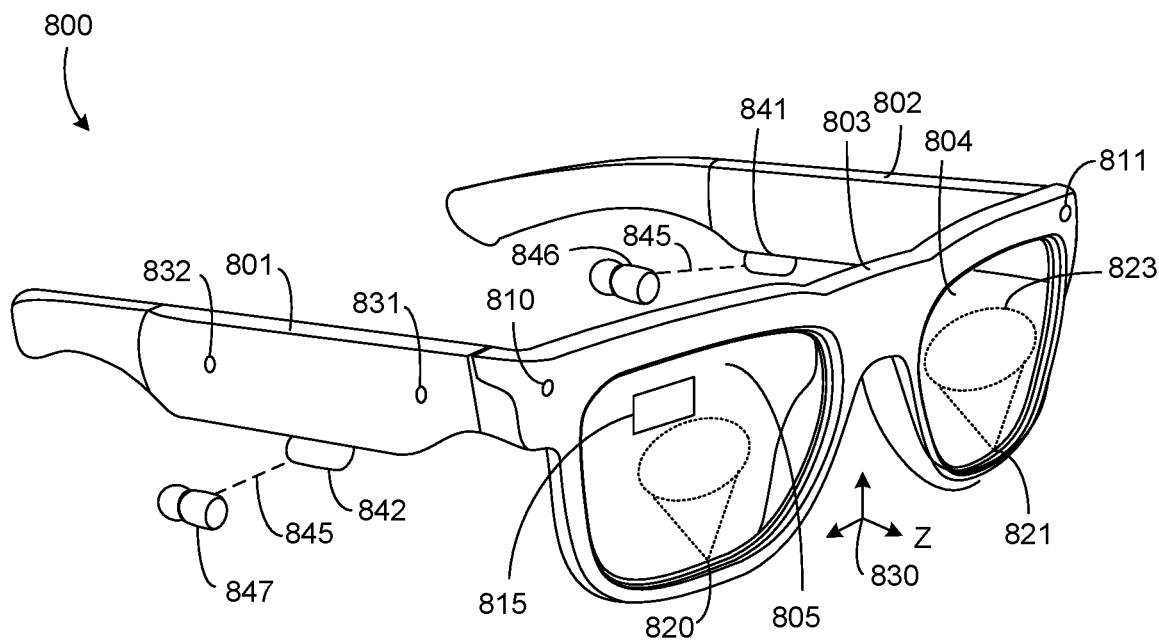
FIG. 7 is a perspective view of AR glasses according to a possible implementation of the present disclosure.

The disclosed techniques may be implemented on an AR device, such as AR glasses. FIG. 7 is a perspective view of AR glasses according to a possible implementation of the present disclosure. The AR glasses 800 are configured to be worn on a head and a face of a user. The AR glasses 800 include a right earpiece 801 and a left earpiece 802 that are supported by the ears of a user. The AR glasses further include a bridge portion 803 that is supported by the nose of the user so that a left lens 804 and a right lens 805 can be positioned in front a left eye of the user and a right eye of the user respectively. The portions of the AR glasses can be collectively referred to as the frame of the AR glasses. The frame of the AR glasses can contain electronics to enable function. For example, the frame may include a battery, a processor, a memory (e.g., non-transitory computer readable medium), and electronics to support sensors (e.g., cameras, depth sensors, microphones, IMU, etc.), and interface devices (e.g., speakers, display, network adapter, etc.).

The AR glasses 800 can include a FOV camera 810 (e.g., RGB camera) that is directed to a camera field-of-view that overlaps with the natural field-of-view of the user's eyes when the glasses are worn. In a possible implementation, the AR glasses can further include a depth sensor 811 (e.g., LIDAR, structured light, time-of-flight, depth camera) that is directed to a depth-sensor field-of-view that overlaps with the natural field-of-view of the user's eyes when the glasses are worn. Data from the depth sensor 811 and/or the FOV camera 810 can be used to measure depths in a field-of-view (i.e., region of interest) of the user (i.e., wearer). In a possible implementation, the camera field-of-view and the depth-sensor field-of-view may be calibrated so that depths (i.e., ranges) of objects in images from the FOV camera 810 can be determined, where the depths are measured between the objects and the AR glasses.

The AR glasses 800 can further include a display 815. The display may present AR data (e.g., images, graphics, text, icons, etc.) on a portion of a lens (or lenses) of the AR glasses so that a user may view the AR data as the user looks through a lens of the AR glasses. In this way, the AR data can overlap with the user's view of the environment.

The AR glasses 800 can further include an eye-tracking sensor. The eye tracking sensor can include a right-eye camera 820 and a left-eye camera 821. The right-eye camera 820 and the left-eye camera 821 can be located in lens portions of the frame so that a right FOV 822 of the right-eye camera includes the right eye of the user and a left FOV 823 of the left-eye camera includes the left eye of the user when the AR glasses are worn.

The AR glasses 800 can further include a plurality of microphones (i.e., 2 or more microphones). The plurality of microphones can be spaced apart on the frames of the AR glasses. As shown in FIG. 7, the plurality of microphones can include a first microphone 831 and a second microphone 832. The plurality of microphones may be configured to operate together as a microphone array that has a beam of sensitivity directed in a particular direction.

The images (i.e., FOV, eye tracking) and the depth data collected by the AR glasses can be calibrated with (i.e., registered to) a coordinate system 830 (i.e., frame of reference), as shown in FIG. 7. The sensitivity (i.e., beam) of the microphone array can also be registered to the coordinate system 830 so that a gaze direction or a focus point may reference this coordinate system.

As shown in FIG. 7, the AR glasses may further include a left speaker 841 and a right speaker 842 configured to transmit audio (e.g., beamformed audio) to the user. Additionally, or alternatively, transmitting audio to a user may include transmitting the audio over a wireless communication link 845 to a listening device (e.g., hearing aid, earbud, etc.). For example, the AR glasses may transmit audio (e.g., beamformed audio) to a left wireless earbud 846 and to a right earbud 847.

Figure 8:
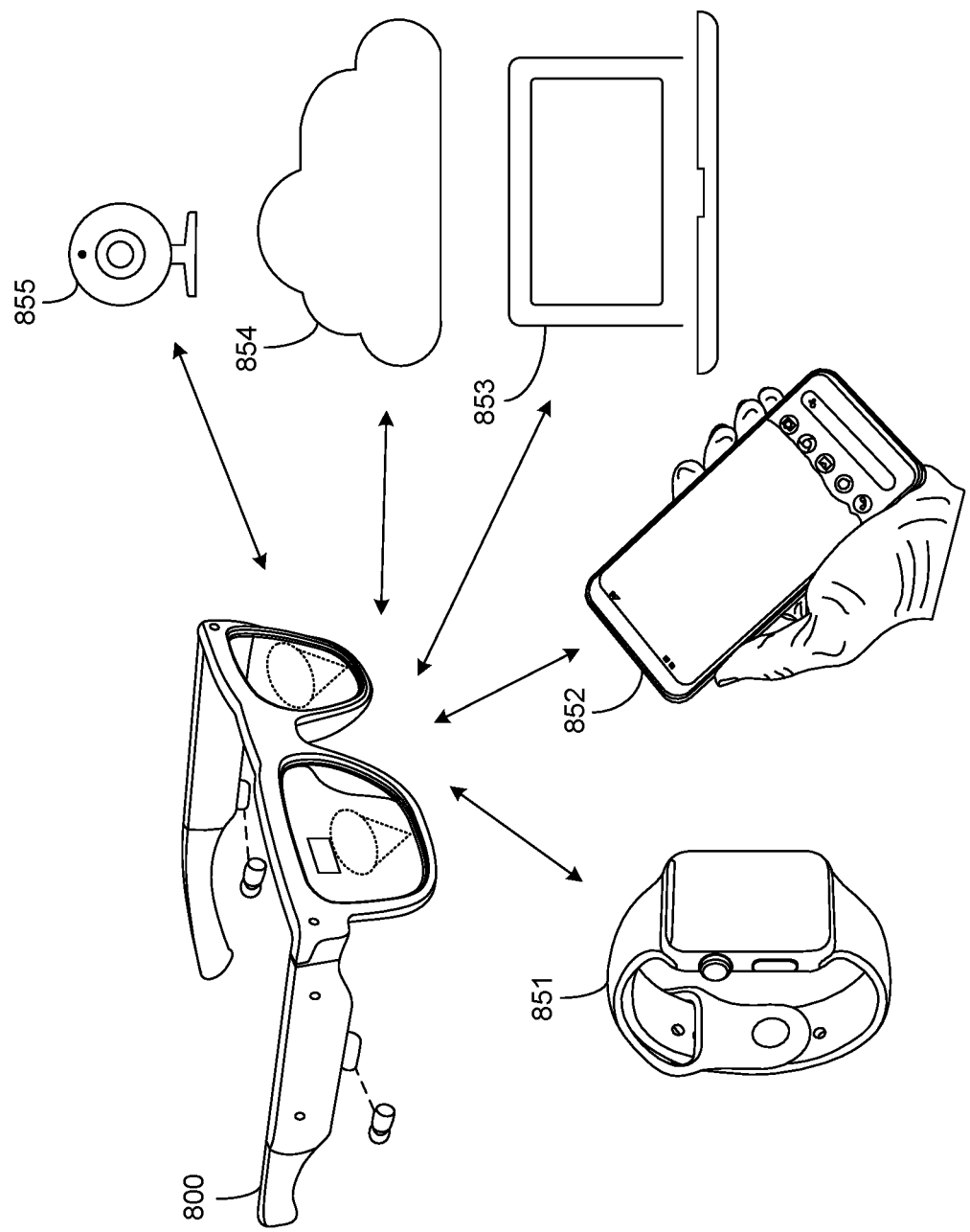
FIG. 8 illustrates a system for detecting audio/behavior event correlation according to a possible implementation of the present disclosure.

FIG. 8 illustrates a system for detecting audio/behavior event correlation according to a possible implementation of the present disclosure. The system includes smart eyewear, such as the AR glasses 800 shown in FIG. 7. All, or a portion, of the methods described herein may be performed on the AR glasses 800. In possible implementations, some of the data collection (e.g., user sensing), processing (e.g., correlation), and/or responses (e.g., transcription) for the disclosed methods are performed by devices in communication with the AR glasses. These devices may include (but are not limited to) a smart watch 851, a mobile phone 852, a laptop computer 853, a cloud network 854, and a camera 855 (e.g., conference camera, webcam, CCTV, etc.).

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A method comprising:
capturing audio of a conversation;
analyzing the audio to detect a speaker change event with a first confidence level;
analyzing a feature of a user to detect a behavior event;
detecting a correlation between the speaker change event and the behavior event using a machine learning model;
adjusting the first confidence level of the speaker change event to a second confidence level based on the correlation; and
generating a change in a speech-to-text transcript of the conversation based on the second confidence level of the speaker change event.

2. The method according to claim 1, wherein capturing the audio is by a microphone array of AR glasses worn by the user.

3. The method according to claim 1, wherein the speaker change event corresponds to when a first person in the conversation has stopped speaking and a second person in the conversation has started speaking.

4. The method according to claim 1, wherein analyzing the audio includes speaker localization, based on a sensitivity of a microphone array.

5. The method according to claim 1, further comprising sensing the user to measure the feature of the user using an inertial measurement unit of AR glasses worn by the user.

6. The method according to claim 1, further comprising sensing the user to measure the feature of the user using an eye tracker of AR glasses worn by the user.

7. The method according to claim 1, further comprising sensing the user to measure the feature of the user using a galvanic skin response sensor of a device worn on a wrist of the user.

8. The method according to claim 1, further comprising sensing the user to measure the feature of the user using a photoplethysmography sensor of a device worn on a wrist of the user.

9. The method according to claim 1, wherein the feature of the user is included in a plurality of features of the user, the plurality of features including a position of a head of the user.

10. The method according to claim 9, wherein the plurality of features of the user include a gaze of the user.

11. The method according to claim 10, wherein the behavior event is a change in attention of the user.

12. The method according to claim 1, wherein the feature of the user is included in a plurality of features of the user, the plurality of features including a pupil size of one eye, or both eyes, of the user.

13. The method according to claim 12, wherein the behavior event is a change in cognitive load of the user.

14. The method according to claim 1, wherein the feature of the user is included in a plurality of features of the user the plurality of features including a skin conductance of the user.

15. The method according to claim 14, wherein the plurality of features of the user include a heart rate of the user.

16. The method according to claim 15, wherein the behavior event a surprise of the user.

17. The method according to claim 1, wherein the machine learning model is a neural network.

18. The method according to claim 1, wherein the machine learning model is a state vector machine (SVM) or a random decision forest.

19. The method according to claim 3, wherein the change includes:
inserting a line break, changing a color, or adding tag at the speaker change event in the speech-to-text transcript to separate speakers of the conversation.

20. An augmented reality device comprising:
a microphone array configured to capture audio of a conversation;
an inertial measurement unit configured to measure a position of a head of a user;
an eye tracker configured to measure a gaze of an eye of the user;
a heads-up display configured to display a speech-to-text transcript of the conversation to the user; and
a processor configured by software instructions to:
analyze the audio to detect a speaker change event with a first confidence level;
analyze the position of the head of the user and the gaze of the eye of the user to detect a behavior event;
detect a correlation between the speaker change event and the behavior event using a machine learning model;
adjust the first confidence level of the speaker change event to a second confidence level based on the correlation; and
generate a change in the speech-to-text transcript based on the second confidence level of the speaker change event.

21. The augmented reality device according to claim 20, wherein the change includes:
inserting a line break, changing a color, or adding tag at the speaker change event in the speech-to-text transcript to separate speakers of the conversation.

22. The augmented reality device according to claim 20, wherein the processor is further configured by the software instructions to:
adjust a beam forming of the microphone array of the augmented reality device based on the second confidence level of the speaker change event.

23. The augmented reality device according to claim 20, wherein the processor is further configured by the software instructions to:
adjust a noise cancellation of the augmented reality device based on the second confidence level of the speaker change event.

* * * * *